Oct. 23, 1951 J. J. BLACK 2,572,240
PROP MECHANISM FOR SEMITRAILERS
Filed Aug. 6, 1946 2 SHEETS—SHEET 1
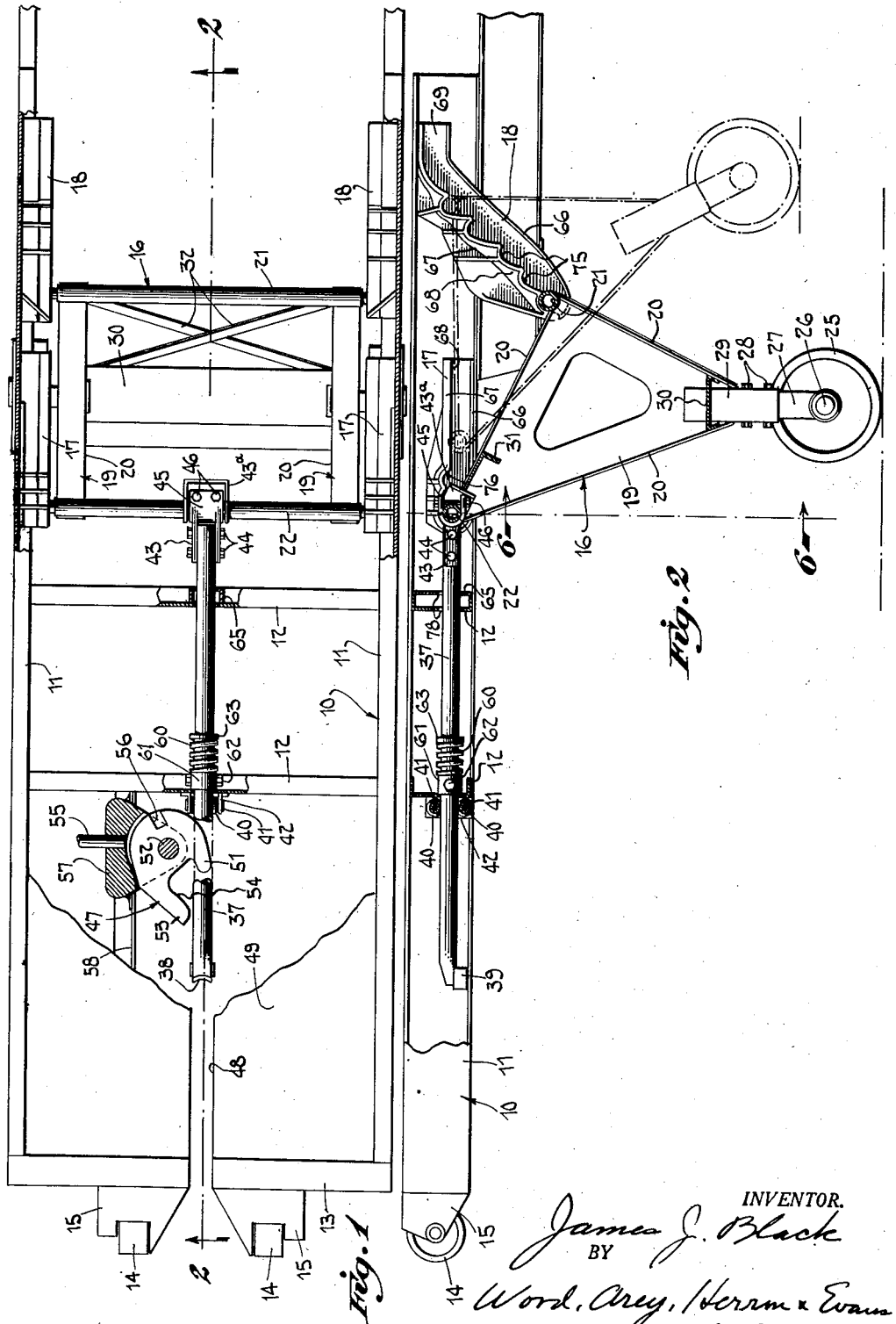

Oct. 23, 1951   J. J. BLACK   2,572,240
PROP MECHANISM FOR SEMITRAILERS
Filed Aug. 6, 1946   2 SHEETS—SHEET 2
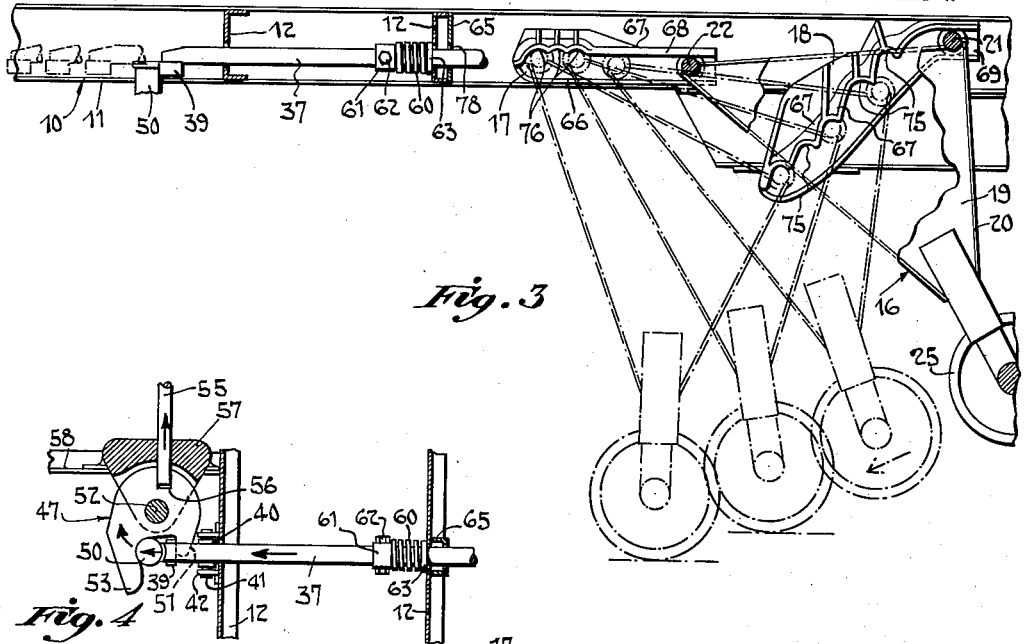
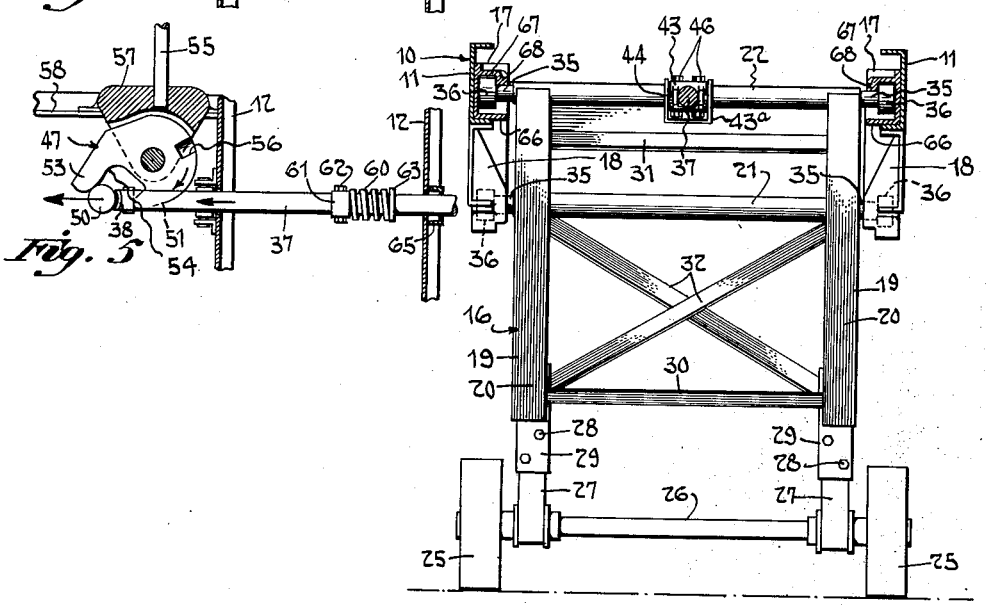
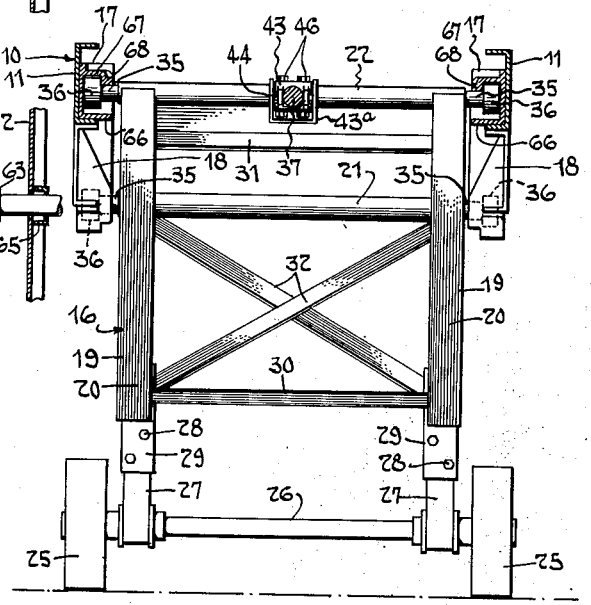
INVENTOR.
James J. Black
BY
Wood, Arey, Herron & Evans
ATTORNEYS Patented Oct. 23, 1951

2,572,240

UNITED STATES PATENT OFFICE 2,572,240

PROP MECHANISM FOR SEMITRAILERS

James J. Black, Cincinnati, Ohio, assignor, by mesne assignments, to Trailmobile Inc., a corporation of Delaware Application August 6, 1946, Serial No. 688,724

12 Claims. (Cl. 280—33.05)

This invention relates to semi-trailers and has particular reference to an improved landing gear or prop which is automatically lowered to support the forward end of the trailer when it is uncoupled from the tractor and which is automatically retracted when the trailer is coupled to the tractor for road service.

The type of trailer which embodies the present improvement conventionally includes an upper fifth wheel at its forward end which is designed to rest upon a lower fifth wheel carried by the tractor, the trailer being provided with road wheels to support its rearward end. When it is coupled to the tractor, the forward end of the trailer is supported by the tractor fifth wheel and its rearward end is carried by the road wheels, and when it is uncoupled, the forward end of the trailer is supported by the prop. The upper and lower fifth wheels respectively include cooperating coupling means which serve to establish a draft connection between the vehicles when they are coupled together for service.

In the present organization the coupling apparatus comprises a king pin mounted upon the tractor as part of the tractor fifth wheel and the king pin is engaged by a coupling jaw mounted upon the trailer as part of the trailer fifth wheel. For this purpose the trailer fifth wheel includes a longitudinal slot arranged to receive the tractor king pin to confine and guide it during its rearward travel toward the coupling jaw as the tractor is backed into the trailer to establish a draft connection.

The present apparatus is designed to retract the prop automatically during the coupling travel of the king pin. For this purpose the trailer coupling mechanism includes a push rod which is longitudinally aligned with the slot and adapted to be engaged at its forward end by the king pin and thrust rearwardly as the king pin traverses the slot in its coupling travel. The rearward end of the push rod is connected directly to the prop and serves to retract or elevate the prop during the coupling movement, and conversely to lower the prop for supporting the trailer during the uncoupling movement.

The apparatus is designed to operate in conjunction with the several standard coupling mechanisms in general use and particularly with the coupling apparatus disclosed in the copending application of James J. Black, Serial Number 689,311 for coupling mechanism for Tractor-Trailer Combinations, which has matured into Patent Number 2,498,847.

It has been the conventional practice to mount the prop in pairs or sets of brackets secured to the trailer chassis, each set of brackets providing a two-point support for the prop respectively at the forward and rearward ends thereof. In order to obtain an angular retracting motion, the forward pair of brackets usually has been disposed on an angle and the rearward pair substantially in a horizontal plane. The respective sets of brackets provide a longitudinal channel or track in which is engaged the opposite end of forward and rearward cross bars as part of the prop by means of which the prop assembly is moved rearwardly and upwardly in retracting.

In order to establish a connection between the push rod and the prop, it has been the conventional practice to interpose a pivotal link between the prop and the rearward end of the push rod. This has been necessitated by reason of the fact that the push rod moves in a horizontal line while the forward end of the prop follows an angular course as determined by the channel or track of the forward support brackets. The use of a link connection, however, is undesirable since it necessarily interposes additional bearings in the connection, causes the retracting force to be applied indirectly to the prop, and increases the necessary lineal motion of the push rod for a given degree of prop retraction. Moreover, the link increases weight, requires additional force to retract the prop because of friction, and renders the assembly more likely to fail or to require service and repair.

The supporting brackets for the prop customarily include a series of notches at different elevations which selectively engage a cross bar as part of the prop to automatically compensate for irregularities in the roadway. In the instance of the conventional forward angular set of brackets, such notches are required to be relatively deep due to the angle of the bracket and in order to insure an adequate engagement of the cross bar. However, it is desirable that the depth of the notches be held to a minimum because there is a pronounced shock when the weight of the trailer is suddenly imposed upon the prop, at the moment it is dropped from the tractor. It will be apparent that the presence of looseness between the brackets and prop supporting bars tends to intensify the impact, thus causing undue wear and tending to set up severe stresses leading to fatigue and possible failure.

In the present improved structure the shock is minimized by placing the forward brackets in such a position that the track or channel is in a relatively horizontal plane. This makes it possible to reduce the depth of the notches since the load imposed upon the prop cross shaft is substantially at right angles to the upper wall or flange of the brackets. The reduction in clearance thereby decreases the impact between the parts on being uncoupled, and consequently lengthens the life of the mechanism, minimizes wear and fatigue, reduces noise and generally improves the performance of the assembly.

The horizontal disposition of the forward brackets moreover permits the forward end of the prop to be connected directly to the push rod, since the push rod and prop both move in a horizontal line. The elimination of the connecting link thereby simplifies the assembly, reduces weight, looseness and friction. The resulting assembly operates with a greater degree of smoothness and ease due to the direct application of the thrust forces from the push rod to the prop, and is more positive in operation.

It has therefore been one of the objects of the inventor to provide an automatic prop assembly in which the prop is connected directly to its actuating push rod in order to reduce looseness between the parts, increase the prop retracting distance relative to push rod movement and reduce friction in the travel of the prop.

It has been a further object to provide an automatic prop mechanism having the forward support brackets of the prop disposed substantially in a horizontal plane to impose the load directly at right angles upon the supporting flanges of the brackets thereby minimizing the depth of the notches and the clearance between the supporting bars and brackets and decreasing shock and fatigue of the parts in service.

It has been another object to provide a prop assembly of improved construction which is light in weight, and of maximum strength and durability.

It has been still another object to provide an automatic prop assembly which more readily adapts itself to irregularities in the roadway upon being lowered and which is automatically elevated to a maximum elevation above the ground in its retracted position to avoid interference with obstruction in the roadway during operation of the vehicle.

Further objects and advantages of the invention will be more fully set forth in the description of the accompanying drawings in which:

Figure 1 is a fragmentary top plan view, partially in section, of the forward portion of a semi-trailer, illustrating the improved prop and its associated mechanism installed in the chassis.

Figure 2 is a longitudinal sectional view taken on line 2—2, Figure 1, showing the prop in its lowered position, the chassis being uncoupled from the tractor and supported upon the prop.

Figure 3 is a diagrammatic side view similar to Figure 2 showing the prop in its retracted position, and showing in broken lines the various positions which the prop may assume with relation to the ground.

Figure 4 is a fragmentary diagrammatic plan view showing the coupling jaw in coupled position with a king pin engaged therein and illustrating the prop actuating push rod in prop retracting position.

Figure 5 is a diagrammatic view similar to Figure 4 showing the coupling jaw in released position and illustrating the uncoupling movement of the king pin and the corresponding prop lowering movement of the push rod.

Figure 6 is a sectional view taken on line 6—6, Figure 2, illustrating the construction of the prop and its relationship with the trailer chassis.

Referring to the drawings, the trailer chassis, indicated generally at 10, is formed of longitudinal side channels 11—11. These channels are joined by means of cross channels 12—12 and an end cross channel 13 at the forward end of the chassis or frame. The trailer includes a set of wheels at its rearward end (not shown). Its forward end, when coupled to the tractor is supported by a lower fifth wheel carried by the tractor. The trailer forward end is equipped with an upper fifth wheel which includes a coupling device including a jaw arranged for engagement with a king pin forming a part of the tractor fifth wheel, for making a draft connection with the tractor.

For this purpose the forward end of the trailer includes a pair of rollers 14—14 pivotally journaled in support brackets 15—15 which are secured to the forward cross channel member 13. The rollers 14—14 are arranged to track upon the inclined skid portion of a tractor (not shown) to elevate the forward end of the trailer preliminary to coupling it to the tractor fifth wheel. The details of the fifth wheel of the tractor are not disclosed in the present application since it is a standard commercial mechanism designed to cooperate with an appropriate trailer fifth wheel in the well known manner.

The retractable prop unit, indicated generally at 16, is carried by support brackets 17 and 18 secured respectively in pairs to the longitudinal channels 11 at opposite sides of the chassis. These brackets are arranged to engage the prop on opposite sides at two points and further to provide for automatic retraction of the prop during coupling travel of a tractor with respect to the trailer, as will be hereinafter disclosed.

Referring to Figure 6, the prop assembly comprises standards 19—19 disposed respectively at the opposite sides of the chassis on the interior of the longitudinal channels 11—11. The standards or support members 19 may be fabricated of a relatively heavy gauge sheet metal, preferably by stamping operation. The respective standards are of identical configuration, each being preferably in the form of a right-angled triangle. The three sides include a laterally inturned web 20 serving to reenforce and stiffen the unit.

The prop standards 19 are connected in spaced relationship by means of cross bars 21 and 22 preferably tubular in cross section and having their ends secured to the standards by welding or other appropriate means. The rearward cross bar 21 is located at the apexes of the standards at the upper sides thereof, and the forward cross bar 22 is located on the upper side forwardly of the bar 21 at the angle between the upper and forward side of the triangular standards.

The lower ends of the standards are provided with wheels or rollers 25 journaled respectively upon opposite ends of an axle 26. The axle is carried by a pair of supports 27—27, these supports in turn being secured by means of bolts 28 to brackets 29 secured at the lower angles of the respective standards by welding or other means. The supports 27 may be provided with a series of holes (not shown) to receive the bolts 28 and permit vertical adjustment of the wheels to accommodate various trailer models.

The respective standards are joined at their lower ends by a cross channel 30 extending horizontally between the two standards with its opposite ends welded or otherwise secured to the standards. A similar cross channel 31 extends between the standards at their upper ends, this channel being located slightly inwardly from the cross bar 22.

The prop assembly is additionally reenforced and stiffened by a cross brace spanning between the respective standards and formed of flat metal strips 32 arranged in X formation. The ends of the strips 32 are joined to the webs 20 of the standards preferably by welding. By means of this construction, the prop assembly is rigidly braced and although light in weight it provides adequate strength to support the forward end of the trailer and its load and to withstand the shocks and impacts incident to dropping the trailer upon its prop.

The prop assembly is joined to the trailer by means of the tubular cross bars 21 and 22 previously described. For this purpose the respective ends of each bar includes stub shafts 35 telescopically engaged in the bar at opposite ends thereof. These journals extend beyond the ends of the bars and project into respective channels or tracks formed in the support brackets 17 and 18 facing inwardly of the chassis. Each stub shaft 35 carries upon its outer end a roller 36 journaled thereon and engaged in the tracks of the respective brackets 17 and 18. The rollers serve to minimize friction and facilitate the automatic lowering and raising of the prop assembly as hereinafter described.

The prop is automatically translated longitudinally relative to the guide brackets 17 and 18 as the trailer is coupled and uncoupled and thereby assumes its appropriate retracted or lowered position with respect to the trailer. For this purpose a prop actuating push rod 37 is provided, the rod being carried centrally of the chassis and having its rearward end pivotally connected to the forward cross bar 22 of the prop. The opposite end of the push rod extends forwardly to a position adapting it to be engaged by the king pin of a tractor fifth wheel when a tractor is coupled to the trailer.

As shown in Figure 1, the forward end of the rod includes a shoe 38 having an arcuate surface corresponding to the radius of the king pin, and it further includes a lug 39 welded to the rod and depending downwardly from the underside thereof. The forward end of the push rod is supported by means of a pair of rollers 40 engaging the upper and lower sides of the rod and pivotally journaled upon pins 41 having their opposite ends engaged in brackets 42 respectively secured to one of the cross channels 12 of the chassis.

The rearward end of the push rod is pivotally connected to the cross bar 22 by means of a bracket 43 secured by bolts 44 to the end of the rod 37. This bracket includes a U-shaped fork or journal facing rearwardly which provides a throat to receive the cross bar 22. A pair of bolts 46 are engaged in holes drilled through the fork or journal and serve to retain the cross bar 22 in place therein. The end of the push rod 37 is thereby pivotally supported upon the cross bar 22 and the retracting motion of the push rod is thus transmitted to the prop to lower or elevate it in accordance with the movements of the push rod. In order to prevent lateral shifting of the rear end of the push rod, the fork portion 45 of bracket 43 is confined between the side walls of a U-shaped clip 43a which is welded to the cross bar 22. By virtue of this construction the prop is readily installed or dismounted from the trailer as a unit by removing the bolts 46 and sliding the prop rearwardly. The brackets 17 and 18 are open at their rearward ends and thereby permit entry or removal of the ends of cross shafts 21 and 22 without dismounting or disturbing the other parts of the organization.

As shown in Figures 1 and 2, the end of the push rod 37 projects forwardly to a point in advance of the coupling jaw indicated generally at 47. The rod is disposed above and in alignment with a king pin guide slot 48 formed in the fifth wheel or guide plate 49 which is secured beneath the trailer chassis at the forward end thereof. In coupling the tractor to the trailer, the king pin 50 of the tractor fifth wheel is confined in and guided by the slot 48 and makes contact with the arcuate shoe 38 of the push rod during the course of king pin rearward travel toward the coupling jaw.

During the coupling travel of the tractor the forward end of the trailer is elevated by the tracking of the rollers 14 upon the upwardly inclined skid of the tractor. The prop therefore is lifted free of the ground and hangs from its supporting brackets 17 and 18 ready to be retracted by action of the push rod 37. As the push rod 37 continues its rearward travel, the prop is retracted and in the final stages the downwardly extended lug 39 comes into engagement with a spur 51 as part of the coupling jaw, thereby causing partial rotation of the jaw, the jaw being pivotally carried by the pivot pin 52 for this purpose. Rotation of the jaw about the axis of this pin causes a coupling finger 53, forming a part of the jaw, to engage the king pin as shown in Figure 4, thus locking the king pin and lug 39 of the push rod together in the recess 54 formed by the contour of the spur 51 and coupling finger 52.

Upon reaching its coupled position, the jaw is locked against rotation by a latching plunger 55 which enters a notch 56 formed in the coupling jaw for this purpose. The pivot pin 52 and latching plunger 55 are carried in a mounting bracket 57 secured to a longitudinal channel member 58 carried by the trailer chassis.

The latching plunger 55 may include spring means to cause it automatically to engage the notch 56 upon completion of the coupling motion of the jaw, thus securely interlocking the king pin and coupler in draft connection. When it is required to uncouple the tractor, the latching plunger is withdrawn manually in the direction indicated in Figure 4, whereupon the king pin is free to be withdrawn from the coupling jaw as indicated in Figure 5, the jaw rotating as shown to permit this. The push rod follows the king pin in its forward travel thereby permitting the prop to descend to a load-sustaining position as will hereinafter be described. The construction and operation of the coupling mechanism is not a material part of the present invention; therefore it is not disclosed in full detail in the present specification and drawings. Reference may be made to the application heretofore mentioned for a complete understanding of the coupling jaw means.

In the preliminary stage of coupling the trailer is sustained upon the rollers 14 engaged upon tractor skid and in the final stages the load is transferred to the fifth wheel. For this purpose the lower fifth wheel of the tractor slides under the trailer fifth wheel and sustains the load. This relative motion between tractor and trailer furnishes the necessary prop lowering movement. Conversely, in uncoupling, this relative motion permits the prop to reach its lowermost position and hang from the respective brackets 17 and 18 while the forward end of the trailer is still supported by the rollers on the tractor skid. As the rollers descend the rearward downwardly inclined portion of the skid, the weight of the trailer is imposed upon the prop.

In order to take up any looseness in the coupling jaw a compression spring 60 is disposed on the push rod 37 and is seated against the collar 61 which is disposed on the rod and secured by a bolt 62. The opposite end of the spring includes a washer 63 slidably engaged on the rod 37. As shown in Figure 4, upon being retracted in coupling position, the washer 63 is engaged against the cross member 12 of the chassis and the spring compressed slightly to cause the push rod to exert a forward thrust against the king pin, thereby taking up any looseness which might otherwise exist by reason of wear after continued service. The cross channel 12 includes a channel-shaped reenforcement 65 welded or otherwise secured thereto to strengthen it. This reenforcement is provided to compensate for the loss in strength at this point due to the opening for the push rod, and enables the cross member to withstand the thrust of the spring 60 when the spring is compressed against the channel.

As shown in Figure 2, the cross bars 21 and 22 include the rollers 36, which guide and support the prop in its retracting and lowering motion. For this purpose the brackets 17 and 18 are provided with respective upper and lower flanges which define a track or channel in which the rollers 36 are confined. The track for the forward bracket 17 is disposed in a horizontal plane and that of the rearward bracket 18 is disposed at an angle in order to impart the desired line of motion to the prop in translating it as hereinafter described.

As shown in Figure 6 each bracket 17 embodies a lower web or flange 66 and an upper flange 67 the inner edge of which includes a downwardly extended vertical lip 68, the rollers 36 being tracked between the flanges. Each rearward angularly disposed bracket 18 likewise is provided with upper and lower webs or flanges 66 and 67 between which are tracked the rollers 36 carried by the rearward cross bar 21. This bracket, similar to bracket 17, includes an overhanging vertical lip 68. The tracks of the brackets 18 terminate in horizontal rearward portions 69, which confine the rollers 36 in the final retracted position of the prop. It will be evident that so long as the push rod is held in its rearward position with the king pin engaged in the coupling jaw, the prop is securely locked in its elevated or retracted position as shown in Figure 3.

Upon uncoupling, the push rod will follow the forward motion of the kind pin and the prop will descend by gravity following the downwardly inclined webs 66 upon which the rollers 36 are tracked. The initial lowering motion of the prop is positive since it is imparted by the spur 51 of the clamping jaw. As shown in Figure 5, the withdrawing motion of the king pin against the coupling finger 53 causes partial rotation of the coupling jaw, and by reason of the engagement of the spur 51 behind the lug 39 of the pull rod the rod is forced in a forward direction. This positive motion is sufficient to carry the rollers of cross shaft 21 out of the horizontal portion 69 of the bracket 18. Thereafter the lowering motion of the prop is continuous by gravity, until the wheels 25 come into contact with the ground or road-way surface or reaches its lower limit of travel.

The descending movement of the prop, as described by the wheel 25, is a combination of lineal and arcuate movement due to the prop swinging upon the forward cross bar 22, the horizontal travel of the bar 22, and the angular lineal movement of the cross bar 21 in descending the inclined track of bracket 18. These combined motions cause the wheels 25 of the prop to have a distance of travel approximately twice the lineal travel of the push rod 37. This insures that the prop is elevated a sufficient height to avoid obstructions when the trailer is coupled to the tractor and in service. Moreover, the relatively short motion of the push rod provides for more efficient operation and permits the lowering of the prop well in advance of the point at which the rollers reach the inclined skid portion of the tractor fifth wheel. This results in an increased margin of safety by reason of the fact that the prop is fully lowered prior to imposing the weight of the trailer on it.

As the tractor pulls away, withdrawing its supporting skid, the forward end of the trailer drops until the bearing studs 35 of the cross bar 21 are engaged in a pair of the series of notches 75 formed in the upper edges 68 of brackets 18, whereupon the weight of the trailer is supported by the prop. These notches permit the prop to adjust itself automatically to the level of the road-way by engaging the cross bar studs in the appropriate set of notches consistent with the level of the roadway. In other words, after being released the prop will descend either until the wheels 25 touch the ground, if there is a high area in the roadway, or it will descend to the lower limit of travel at which point the cross bar 21 reaches the end of the track in bracket 18. If the wheels contact the ground, then upon the trailer being dropped from the tractor skid, the studs 35 will enter one of the upper pairs of notches 75 nearest to them, thus compensating for the high area. If the prop has descended to its lower limit then the cross bar will enter the lowermost pairs of the notches. In both instances the trailer drops substantially the same distance.

The compensating function of the prop mechanism prevents it from dropping too low for recoupling should a low area be encountered and permits it to compensate for a high area. As shown in Figure 3, several possible conditions are indicated, in each instance the trailer being supported by a different set of the notches 75.

It will be apparent, as shown in Figure 3, that the trailer weight is divided between the cross bars 21 and 22. In order to stabilize the prop, therefore, the forward brackets 17 are provided with a series of notches 76 for engagement by the studs of the forward bar 22. These notches are three in number and cooperate with the lower three notches 75 of brackets 18. In other words, when the cross shaft 21 is engaged in the respective pair of bottom notches in brackets 18, cross shaft 22 is engaged in the first or foremost pair of notches 76. The second and third notches of brackets 17 and 18 likewise coincide, the prop being engaged by the notches selectively in sets as shown in the alternate positions.

As shown engaged in the lowermost notch 76, it will be apparent that the load is divided almost equally between the cross bars 21 and 22 due to the location of the wheel center between the cross bars. When engaged in the upper notches 75, the alignment of the wheel center with the center of cross bar 21 progressively increases, thereby imposing a greater proportion of the load upon cross bar 21. When engaged in either of the two upper notches the entire load is imposed on the bar 21 therefore it is not required that the forward cross bar 22 be engaged in a notch. For this reason the notches 76 are omitted in the remaining rearward length of the bracket 17.

As shown in Figure 6, when resting upon the prop the weight of the trailer is imposed upon the bearing extensions 35 which are engaged in the overhanging edges 68 of the respective brackets 17 and 18. Therefore, the rollers 36 serve only in tracking the prop during its traversing movements.

The forward cross bar 22 follows a horizontal line of travel as guided by the tracks of brackets 17, parallel with and in alignment with the push rod 37. Therefore the prop actuating rod 37 may be coupled directly to the forward cross bar 22 of the prop without the use of a link connection therebetween.

When the trailer is dropped from the tractor, the cross bar 21 is forced upwardly in a perpendicular direction at right angles to the tops of the brackets 17. By reason of the horizontal track the latching notches 76 in the upper web 67 may be relatively shallow there being a direct thrust at right angles to the notches. This reduces the clearance necessary between the notches 76 and the bearing studs 36 of the cross shaft 22 and thereby materially reduces the shock imparted to the prop assembly when the trailer drops to the ground.

In contacting the ground the slight upward motion of the cross bar carries the push rod with it and for this reason a clearance hole 78, sufficiently large for this purpose, is formed in the rearward cross channel 12 and the reenforcing bracket 65.

The improved assembly eliminates the use of connecting links between the prop and the actuating rod ordinarily necessary in installations having an angular forward bracket. The construction minimizes shock by reducing the amount of clearance between the prop and its supporting brackets and thereby reduces failure of the parts, excessive wear, and lengthens the life of the mechanism. Additionally, the improved fabrication of the standards 19 reduces the weight of the prop and the elimination of linkage between the prop and the actuating rod reduces looseness and friction and improves the performance of the mechanism.

Having described my invention, I claim:

1. A prop mechanism for the forward end of a semi-trailer including the semi-trailer frame comprising; a pair of channel-shaped guide brackets fixed to opposite inner sides of the trailer frame with the respective channels opening toward each other and disposed in a substantially horizontal plane, a second pair of channel-shaped guide brackets fixed in a similar manner to the trailer frame rearwardly of the first mentioned brackets and disposed on an angle thereto and spaced therefrom, with the lowermost ends of the angulated pair of brackets being forward and disposed below the plane of the horizontally disposed brackets, a prop having means disposed in said guideways for supporting the prop and guiding it in raising and lowering movements, said inclined guide brackets including notches cooperating with said means for engagement thereby when the prop engages the ground, and a prop actuating means translating said prop in the guide brackets, said latter means attached to the forward end of the prop for causing the forward end to move in a horizontal plane and the rear end of the prop to slide up and down the inclined guide brackets thereby imparting a swinging movement to the prop and a raising and lowering movement to the lower end thereof.

2. A prop mechanism for the forward end of a semi-trailer, including the semi-trailer frame, comprising; a pair of channel-shaped, horizontally disposed guideways fixed to opposite sides of the trailer frame, a pair of inclined channel-shaped guideways fixed to opposite sides of the trailer frame to the rear of the first mentioned guideways, said inclined guideways slanting upwardly toward the rear of the semi-trailer frame, a prop structure, tubular cross bars at the forward and rear upper ends of said prop structure, studs projecting from the tubular bars at the respective ends thereof, rollers carried by the studs engaged in the respective guideways, said inclined guideways including notches cooperating with the studs for engagement thereby when the prop engages the ground, and prop actuating means for translating said prop structure in said guideways for raising and lowering the prop as the semi-trailer is coupled and uncoupled relative to a tractor.

3. In a semi-trailer including a chassis having wheels at its rearward end and a prop retractably mounted at its forward end; a set of tracks arranged in forward and rearward pairs and secured to said chassis in spaced relationship, said prop being translatably mounted in said tracks, a translatable push rod, spaced bearings mounted upon the chassis and arranged to slideably support the push rod for axial movement substantially in a horizontal plane, the rearward end of the push rod being extended beyond said bearings and pivoted directly to said prop, the forward of said pair of tracks being disposed in alignment with said push rod to permit the forward portion of the prop to be translated in alignment with the push rod, and the rearward of said tracks being disposed in an inclined plane to raise and lower the rearward portion of the prop upon translation of the prop.

4. In a semi-trailer including a chassis having wheels at its rearward end and a retractable prop mechanism at its forward end comprising; a prop unit, said prop unit having forward and rearward cross bars disposed in spaced relationship, respective sets of guide brackets, said brackets arranged in forward and rearward pairs secured to the chassis each pair defining a track adapted to receive and guide the ends of said cross bars respectively, the track for the forward cross bar being disposed in a horizontal plane and the track for said rearward cross bar being located in an angular plane, said angular plane being such that the track extends upwardly toward the rear of the chassis with the forward end below the plane of said horizontally disposed track, and a push rod connected to said forward cross bar, bearing means on the chassis arranged to slideably support the push rod for axial movement substantially in plane with said horizontal track, said rearward track being provided with a series of notches in the upper portion thereof arranged to engage said cross bar when the weight of the trailer is imposed upon said prop, and said angular rearward track including a horizontal end portion adapted to support the prop in elevated position when it is retracted.

5. A retractable prop mechanism for semi-trailers comprising a prop unit, said prop unit having cross bars respectively disposed forwardly and rearwardly thereof, respective pairs of forward and rearward brackets, each pair of brackets providing respectively a track to receive and confine opposite ends of said cross bars, the track for the forward cross bar being disposed in a horizontal plane and the track for said rearward cross bar being disposed in an angular plane, each pair of brackets being channel-shaped and fixed to opposite inner sides of the trailer frame with the respective channels opening toward each other, and a translatable push rod connected to said forwardly disposed cross bar, bearing means on the chassis arranged to slideably support the push rod for axial movement substantially in horizontal alignment with the forward horizontal track, said push rod operable to translate the prop in said tracks to lower or elevate the same, the forward cross bar thereby traveling in a horizontal path and the rearward bar traveling in an angular path.

6. In a semi-trailer including a chassis having wheels at its rearward end and a retractable prop mechanism at its forward end comprising; a prop unit, said prop unit having forward and rearward cross bars disposed in spaced relationship, guide brackets, said brackets arranged in forward and rearward pairs and comprising respective pairs of channel-shaped members fixed to opposite inner sides of the trailer frame with the respective pairs of channels opening toward each other, each pair of brackets respectively defining a track adapted to receive and guide the ends of said respective cross bars, the track for the forward cross bar being disposed in a horizontal plane and the track for said rearward cross bar being disposed on an inclined plane, said inclined plane slanting upwardly toward the rear of said chassis, and a push rod connected to said forward cross bar, bearing means on the chassis arranged to slideably support the push rod for axial movement substantially in a horizontal plane in alignment with the track for the forward cross bar, said channels respectively being provided with a series of notches in the upper portions thereof arranged to be engaged by said cross bar when the weight of the trailer is imposed upon said prop.

7. A retractable prop mechanism for semi-trailers comprising a prop unit, said prop unit having cross bars disposed forwardly and rearwardly thereof, respective sets of forward and rearward brackets, each set of brackets providing a channel to receive and confine the opposite ends of said cross bars, the channel for the forward cross bar being disposed in a horizontal plane and the channel for said rearward cross bar being disposed on an inclined plane, a translatable push rod, a fork element on the rearward end of the push rod, said fork element engaged over said forwardly disposed cross bar, and a removable element in said fork element, said element confining said cross bar in the fork element.

8. A retractable prop mechanism for a semi-trailer chassis comprising; a prop unit, said prop unit having forward and rearward cross bars disposed in spaced relationship, guide brackets, said brackets arranged in forward and rearward pairs secured to said chassis, each pair of brackets respectively defining a channel adapted to receive and guide the ends of said respective cross bars, the channel for the forward cross bar being disposed substantially in a horizontal plane and the channel for said rearward cross bar being disposed on an inclined plane with said plane slanting upwardly toward the rear of said chassis, a push rod, support means mounted on the chassis for slideably supporting the push rod, the rearward end of the push rod being extended beyond the support means and pivotally connected directly to the said forward cross bar, said channels respectively being provided with a series of notches in the upper portions thereof, the individual notches of each series being spaced cooperatively to be engaged by said cross bars in pairs when the weight of the trailer is imposed upon said prop, said forward cross bar being arranged to sustain the greater portion of the load when the load is imposed in a line substantially at right angles to the upper portion of the horizontal channel.

9. A retractable prop mechanism for semi-trailers comprising a prop unit, said prop unit having cross bars disposed forwardly and rearwardly thereof, respective sets of forward and rearward brackets, each set of brackets providing respectively a channel to receive and confine the opposite ends of said cross bars, the channel for the forward cross bar being disposed substantially in a horizontal plane and the channel for said rearward cross bar being disposed on an inclined plane, each channel being open at an end for entry of the ends of said cross bars therein to permit mounting or dismounting of the prop unit, a translatable push rod, a fork element on the rearward end of the push rod, said element adapted to be engaged over said forwardly disposed cross bar and a removable element on said fork element, said element confining said cross bar in the fork element, the prop thereby being adapted to be dismounted by removing said element and translating the prop to disengage the cross bars from said channels.

10. In a semi-trailer including a chassis having wheels at its rearward end and a retractable prop mechanism at its forward end comprising; a prop unit, said prop unit having forward and rearward cross bars disposed in spaced relationship, respective sets of guide brackets, said brackets arranged in forward and rearward pairs and secured to the chassis at respective opposite sides thereof and each pair defining a track adapted to receive and guide the opposite ends of respective cross bars, the track for the forward cross bar being disposed substantially in a horizontal plane and the track for said rearward cross bar being located on an inclined plane, a push rod pivotally connected to said forward cross bar and adapted to be translated in alignment with said horizontal track, and said tracks respectively being provided with a series of notches in the upper portion thereof, the individual notches of each series arranged in cooperating sets to engage the forward and rearward cross bars respectively with the load divided between said cross bars when the weight of the trailer is imposed upon said prop.

11. A prop mechanism for the forward end of a semi-trailer comprising; a prop unit, said prop unit including an axle and a pair of cross bars, said axle having wheels at the respective outer ends, the axle and cross bars being disposed in parallel relationship with the bars above the axle and one bar forward of the other bar, a prop framework fixed to said bars and said axle for retaining the bars and axle in spaced relationship, a horizontally disposed push rod, bearing means on the chassis arranged to slideably support the push rod for axial movement substantially in a horizontal plane, an end of the push rod being extended beyond the support means into direct pivotal connection with the forwardly disposed cross bar, the forwardly disposed bar being adapted to move in a substantially horizontal plane, the rearwardly disposed bar being adapted to move angularly with respect to the plane of movement of the first bar between points below that plane and a point above that plane, the lowermost point being disposed forwardly of the upper point, and channels for confining said bars within these lines of movement whereby rearward motion of the push rod causes the first bar to move rearwardly substantially in the horizontal plane and the second bar to move rearwardly and upwardly.

12. In a semi-trailer including a chassis having wheels at its rearward end and a prop mounted at its forward end arranged to be raised and lowered, respective forward and rearward sets of laterally spaced brackets attached to the chassis engaging the said prop, the prop having spaced bearings engaged in said respective sets of brackets adapting the prop to be translated longitudinally relative to the brackets to raise and lower the prop, the forward set of brackets being disposed substantially in a horizontal plane and the rearward set being inclined upwardly toward the rear of the chassis, a slideable push rod for translating the prop, and support means for slideably supporting the push rod for axial movement substantially in horizontal alignment with the said forward horizontal set of brackets, the rearward end of the push rod being extended beyond the said support means and pivotally connected to the prop substantially in alignment with the spaced bearings which engage the forward set of horizontal brackets to cause raising and lowering of the prop upon axial movement of the push rod.

JAMES J. BLACK.

REFERENCES CITED

The following references are of record in the file of this patent:

UNITED STATES PATENTS

| Number | Name | Date |
|---|---|---|
| 1,611,947 | Reid | Dec. 28, 1926 |
| 1,660,663 | Winn | Feb. 28, 1928 |
| 1,921,250 | Connors et al. | Aug. 8, 1933 |
| 2,123,820 | Winn | July 12, 1938 |
| 2,190,373 | Black | Feb. 13, 1940 |
| 2,246,410 | Wilson | Jan. 17, 1941 |